Jan. 7, 1969  J. BATTERMANN ET AL  3,420,097
VIBRATION COUPLING DEVICE FOR AN ULTRASONIC TRANSDUCER
Filed Dec. 22, 1965
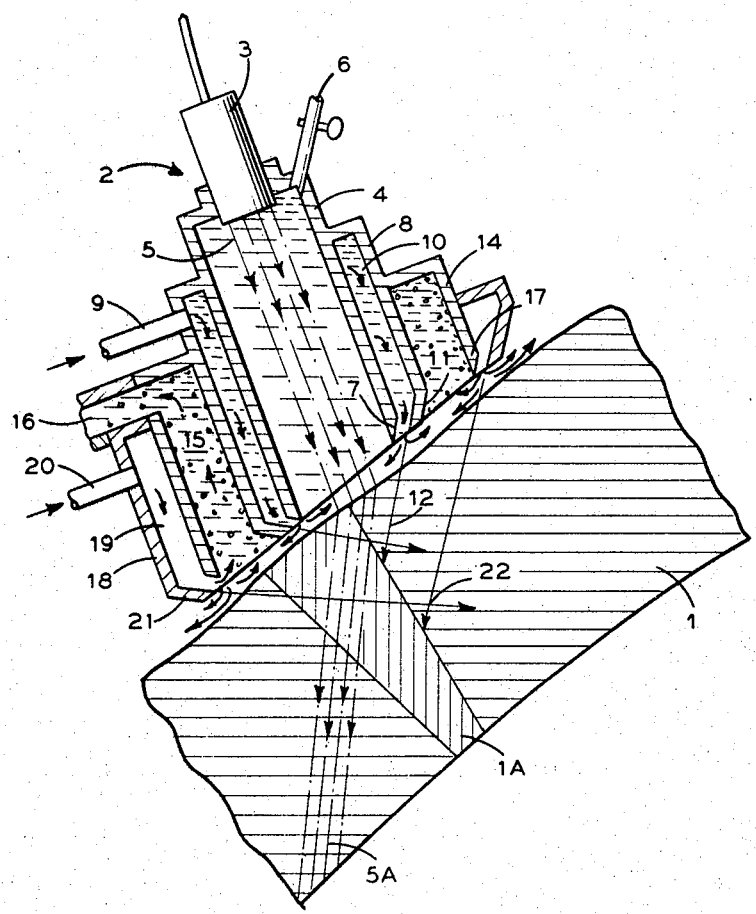
INVENTORS
Johan Battermann
Bernard Froman
BY
ATTORNEY United States Patent Office 3,420,097
Patented Jan. 7, 1969

3,420,097
VIBRATION COUPLING DEVICE FOR AN
ULTRASONIC TRANSDUCER
Johan Battermann, Aubervilliers, and Bernard Froman,
Paris, France, assignors to Babcock & Wilcox, Limited,
London, England, a company of Great Britain
Filed Dec. 22, 1965, Ser. No. 515,624
Claims priority, application France, Dec. 24, 1964,
999,896
U.S. Cl. 73—71.5                                  8 Claims
Int. Cl. G01n 29/00

ABSTRACT OF THE DISCLOSURE

A liquid coupling device for coupling ultrasonic energy to a workpiece surface through a column of liquid. The coupling device preferably comprises a tubular member for containing the column of liquid, has an ultrasonic emitter mounted on one of its ends and a nozzle about the periphery of its other end, which is open. In operative relationship with respect to the workpiece, the open end of the tubular member is located apart from (but adjacent) the workpiece. In operation, the nozzle directs a jet of liquid from a pressurized source against the workpiece and inwardly toward the open end of the tubular member to establish and maintain the column of liquid.

---

This invention relates generally to a liquid coupling device, and more particularly to a device for coupling an energy beam emitter to a workpiece surface through a column of coupling liquid.

In copending application Ser. No. 351,342, filed Mar. 12, 1964, now Patent No. 3,323,354 there was disclosed an ultrasonic flaw detection device having a probe head assembly, the crystal of which was arranged to emit a beam of ultrasonic energy through a column of liquid maintained in a cylindrical chamber. The liquid was circulated through the chamber under low pressure and formed a workpiece-contacting meniscus by capillarity, the water subsequently being collected by gravity in an annular trough. This device made it possible to explore even irregular surfaces with the technical advantages of the immersion method of ultrasonic testing, even though the necessity of immersing the workpiece in a tank was dispensed with. In the device particularly described in the above-mentioned copending application, the probe was placed under the workpiece being tested, and appropriate mechanism was provided for moving the probe and for recording the echoes of the emitted ultrasonic beam.

The maintenance of a column of liquid in contact with a workpiece for purposes of ultrasonic flaw detection requires a stable and homogeneous liquid column, free from air bubbles, and in permanent wetting contact with the workpiece surface. Also it is necessary that the integrity of the junction between the water column and workpiece surface be maintained even when the probe is moved rapidly during testing of the workpiece. Moreover, it should be recognized that the water column must be maintained in integral engagement with the workpiece even though it is desirable that the chamber walls delimiting the column are not themselves in direct contact with the workpiece so that irregular or rough surfaces may be inspected.

It is therefore an object of the present invention to provide a liquid coupling device suitable for maintaining a column of coupling liquid in contact with a workpiece surface for purposes of passing ultrasonic energy waves through the liquid column into the workpiece. It is a further object of the present invention that the column of coupling liquid be maintainable at all possible orientations of the device with respect to the workpiece. It is a still further object of the present invention to provide means for collecting any coupling liquid which may escape from the column of coupling liquid during use of the energy beam emitter.

The above-mentioned objects are attained, according to the present invention, in a liquid coupling device for coupling an energy beam emitter to a workpiece surface through a column of liquid. This device includes a tubular member containing the column of liquid and having an open end spaced from and adjacent the workpiece surface. The column of liquid is established and maintained within the tubular member by means of a liquid nozzle disposed about the periphery of the open end of the tubular member and arranged to direct a jet of coupling liquid in a continuous sheet against the workpiece surface and inwardly toward the axis of the tubular member. Thus, the kinetic energy of the jet of coupling liquid is transformed into pressure energy as manifested by the head of liquid retained within the tubular member. Any coupling liquid which escapes from the periphery of the liquid nozzle may be suitably collected within an annular chamber which is disposed about the tubular member and has an open end communicating with the periphery of the liquid nozzle. A pneumatic nozzle is arranged about the periphery of the collection chamber in such a fashion so as to direct a peripheral sheet of air inwardly toward the area of the workpiece surface being inspected. Thus, the inwardly directed air jet will pick up any water escaping from the liquid jet, and will effectively shield against substantial loss of coupling liquid.

For a better understanding of the invention, its operating advantages and specific objects attained by its use, reference should be had to the following description which refers to the attached drawing which is a partially diagrammatic sectional side view of a probe head assembly embodying the present invention.

Referring to the drawing, an ultrasonic inspection probe head assembly 2 is shown in operative relationship with respect to a workpiece 1 having therein a weld 1A, the integrity of which is to be explored by means of the probe 2. The probe 2 includes an ultrasonic beam emitter crystal 3 mounted on one end of a tubular member 4, which is of generally cylindrical shape. The crystal 3 is of the type normally used for transmitting ultrasonic energy waves (shown at 5) into a workpiece. The opposite open end of the tubular member 4 is spaced from and adjacent the surface of the workpiece 1. It should be noted that the axis of the tubular member 4 is inclined with respect to the workpiece surface so that the angle of incidence of the ultrasonic energy waves emitted by the crystal 3 is such that the refracted energy beam 5A passes through the workpiece at an angle of about 45°. The particular angular relationship of the tubular member 4 with respect to the workpiece is described in detail in the above-mentioned copending U.S. application Ser. No. 351,342.

In the end of the tubular member 4 in which the crystal 3 is mounted, there is provided a suitable vent line 6 which allows the air within the tubular member 4 to escape when the liquid column is initially established. The end of the tubular member 4 that is adjacent the workpiece 1 is enclosed within a concentric tubular sleeve 8 so that an annular coupling liquid supply chamber 10 is defined between the tubular member 4 and the sleeve 8. A liquid supply line 9 communicates with the chamber 10 and connects with a suitable pressurized source of liquid (not shown). The ends of the tubular member 4 and sleeve 8 immediately adjacent the workpiece 1 are formed respectively with beveled portions 7 and 11 to define therebetween an annular nozzle adapted to discharge an inwardly converging conical jet of coupling liquid, the nozzle being arranged so that the jet converges toward an imaginary point (indicated by the numeral 12) located along an extension of the axis of the tubular member 4.

A pair of concentric, spaced annular walls 14 and 18 are arranged about the sleeve 8 and define therebetween an air receiving chamber 19 to which compressed air is supplied from a suitable source (not shown) through the connecting line 20. The innermost (14) of this pair of walls is spaced from the sleeve 8 to form therebetween a collecting chamber 15 which communicates with a suitable outlet 16 which may be connected with a separator (not shown). The edges of the walls 14 and 18 are respectively formed adjacent the surface of the workpiece 1 with beveled portions 17 and 21 so as to form a peripheral pneumatic nozzle communicating with the air supply chamber 19 and arranged to direct an annular sheet of shielding air against the surface of the workpiece 1 and in a direction toward the axis of the tubular member 4, e.g. toward the imaginary point indicated on the drawing at 22.

The probe 2 may be suitably positioned with respect to the surface of the workpiece by means of a wheeled carriage of the type shown in the above-mentioned copending application.

In the operation of the above-described probe head assembly 2, pressurized coupling liquid (preferably water) is introduced into the chamber 10 through the line 9 and is sprayed through the nozzle defined by the beveled ends 7 and 11 of the tubular member 4 and the sleeve 8, the resulting jet being directed obliquely against the surface of the workpiece and inwardly toward the center of the tubular member 4. It should be recognized that by suitably sizing the liquid nozzle and by supplying the coupling liquid to the nozzle with sufficient pressure, the column of liquid within the tubular member may be established and maintained so as to fill the tubular member 4.

Nevertheless, a portion of the coupling liquid will escape from around the periphery of the liquid nozzle since the end of the nozzle is spaced slightly from the surface of the workpiece 1. If desired, escaping liquid may be allowed to run over the surface of the workpiece, however, provisions are made for collecting this escaping liquid. To effect this collection, air or any other compressed gas is supplied under pressure to the chamber 19 through the line 20 so that a converging conical air stream is discharged from the nozzle formed between the portions 17 and 21 of the walls 14 and 18. This conical discharge of air forms a barrier, restraining the liquid from flowing outwardly. The liquid escaping from the periphery of the liquid column in the tubular member 4 is picked up by the air stream and passes through chamber 15 and thence through the outlet 16 to a suitable collector (not shown), wherein the escaping coupling liquid may be accumulated.

Although the probe head assembly 2 shown in the drawing is in a generally upright position, it should be understood that the above-described device will operate satisfactorily at all possible orientations with respect to a workpiece.

By way of description, and not limitation, the above-described probe head assembly 2 may be used with water as the coupling liquid, and air as the peripheral shielding medium. It has been found, for example, that a 90 mm. high bubble-free water column can be suitably maintained within the tubular member 4 by using a nozzle having an annular discharge orifice of about 1 mm. width, and a throughput of about 500–1000 liters per hour. This size of nozzle and this flow rate have been found to produce a stable water column when the tubular member 4 is spaced from the surface of the workpiece by no more than several millimeters. Under these conditions, the stability of the water column has been found to exist even when the probe head assembly 2 is subjected to rapid movements along the workpiece surface, and even though the workpiece surface may be rough and uneven.

What is claimed is:

1. A liquid coupling device for coupling ultrasonic energy to a workpiece surface through a column of liquid comprising, a tubular member for containing said column of liquid, said tubular member having an open end spaced from and adjacent said surface, an ultrasonic emitter mounted on the opposite end of said tubular member, a pressurized source of liquid, and liquid nozzle means disposed about the periphery of said open end and arranged to direct a peripheral jet of liquid from said source in a continuous sheet against said surface and inwardly with respect to said tubular member to establish and maintain said liquid column.

2. The device according to claim 1 wherein said tubular member is of generally circular cross-section.

3. The device according to claim 2 further comprising a tubular sleeve having an open end spaced from and adjacent said surface and substantially concentrically disposed with and enclosing the end of said tubular member to form therebetween a liquid supply chamber into which liquid from said source is introduced, and said liquid nozzle means further comprising an inwardly beveled end portion of said tubular sleeve.

4. The device according to claim 2 further comprising means for collecting liquid escaping from the periphery of said nozzle means.

5. The device according to claim 4 wherein the collecting means comprises pneumatic nozzle means arranged about the periphery of said liquid nozzle means to direct a peripheral sheet of air against said surface and toward said liquid nozzle means.

6. The device according to claim 5 wherein the collecting means further comprises walls defining an annular collection chamber disposed about said tubular member and having its end intermediate said liquid nozzle means and said pneumatic nozzle means.

7. The device according to claim 3 further comprising a pair of concentric spaced annular walls having edges spaced from and adjacent said surface and enclosing said tubular sleeve, said spaced annular walls defining therebetween an annular air supply chamber, and a peripheral pneumatic nozzle communicating with said air supply chamber and arranged to direct a peripheral sheet of air against said surface inwardly toward said tubular sleeve.

8. The device according to claim 7 wherein the innermost of said pair of walls is spaced from said tubular sleeve to form therebetween an annular collection chamber having an end thereof intermediate said pneumatic nozzle means and said liquid nozzle means.

References Cited

UNITED STATES PATENTS

| | | | |
|---|---|---|---|
| 2,873,391 | 2/1959 | Schulze | 73—67.9 XR |
| 3,055,210 | 9/1962 | Joy | 73—71.5 |
| 3,121,325 | 2/1964 | Rankin et al. | 73—67.7 |
| 3,122,661 | 2/1964 | Joy | 73—71.5 XR |

RICHARD C. QUEISSER, *Primary Examiner.*

J. P. BEAUCHAMP, *Assistant Examiner.*

U.S. Cl. X.R.

310—8.7